(12) United States Patent
Repossini

(10) Patent No.: US 6,439,813 B1
(45) Date of Patent: Aug. 27, 2002

(54) HIGH-SPEED PRODUCTION UNIT FOR MACHINING OPERATIONS

(75) Inventor: Claudio Repossini, Milan (IT)

(73) Assignee: Ministero Dell'Universita'E Della Ricera Scientifica E Tecnologia, Roma (IT)

(*) Notice: Subject to any disclaimer, the term of this patent is extended or adjusted under 35 U.S.C. 154(b) by 26 days.

(21) Appl. No.: 09/655,411

(22) Filed: Sep. 5, 2000

(51) Int. Cl.[7] ............... B23C 1/027; B23Q 1/01; B23Q 5/22

(52) U.S. Cl. ............... 409/235; 409/191; 409/137; 409/237; 408/234

(58) Field of Search ............... 409/235, 237, 409/190, 191, 202, 212, 238, 137; 408/234, 235, 237

(56) References Cited

U.S. PATENT DOCUMENTS

| | | | | |
|---|---|---|---|---|
| 3,862,586 A | * | 1/1975 | Galbarini et al. | 409/237 |
| 3,988,965 A | * | 11/1976 | Cayen et al. | 409/237 |
| 4,632,615 A | * | 12/1986 | Yamamura | 409/235 |
| 4,987,668 A | * | 1/1991 | Roesch | 409/212 |
| 5,368,425 A | * | 11/1994 | Mills et al. | 409/235 |
| 5,662,568 A | * | 9/1997 | Lindem | 409/235 |
| 5,829,932 A | * | 11/1998 | Kis et al. | 408/234 |
| 5,988,959 A | * | 11/1999 | Sugata | 409/191 |
| 6,149,561 A | * | 11/2000 | Beecherl et al. | 483/1 |
| 6,161,995 A | * | 12/2000 | Wakazono et al. | 409/191 |

FOREIGN PATENT DOCUMENTS

DE       3312971 A   * 10/1984  ............ 409/237

OTHER PUBLICATIONS

"Technical Library" article on hydraulic symbols, printed from www. hydraulicsupermarket.com on Nov. 16, 2001, pp. 1–4.*

* cited by examiner

Primary Examiner—A. L. Wellington
Assistant Examiner—Erica E Cadugan
(74) Attorney, Agent, or Firm—Sughrue Mion, PLLC

(57) ABSTRACT

A machine tool includes a spindle-headstock structure with a horizontal axis which is displaceable along three mutually orthogonal axes. The headstock structure is mounted so that it slides along an axis Z parallel to the axis of the spindle on a slide. The slide is mounted so that it slides according to a horizontal direction X orthogonal to the axis of the spindle beneath a cross member. The cross member moves vertically between the two uprights of a fixed portal frame.

18 Claims, 11 Drawing Sheets

Fig_2

Fig_3

Fig_4

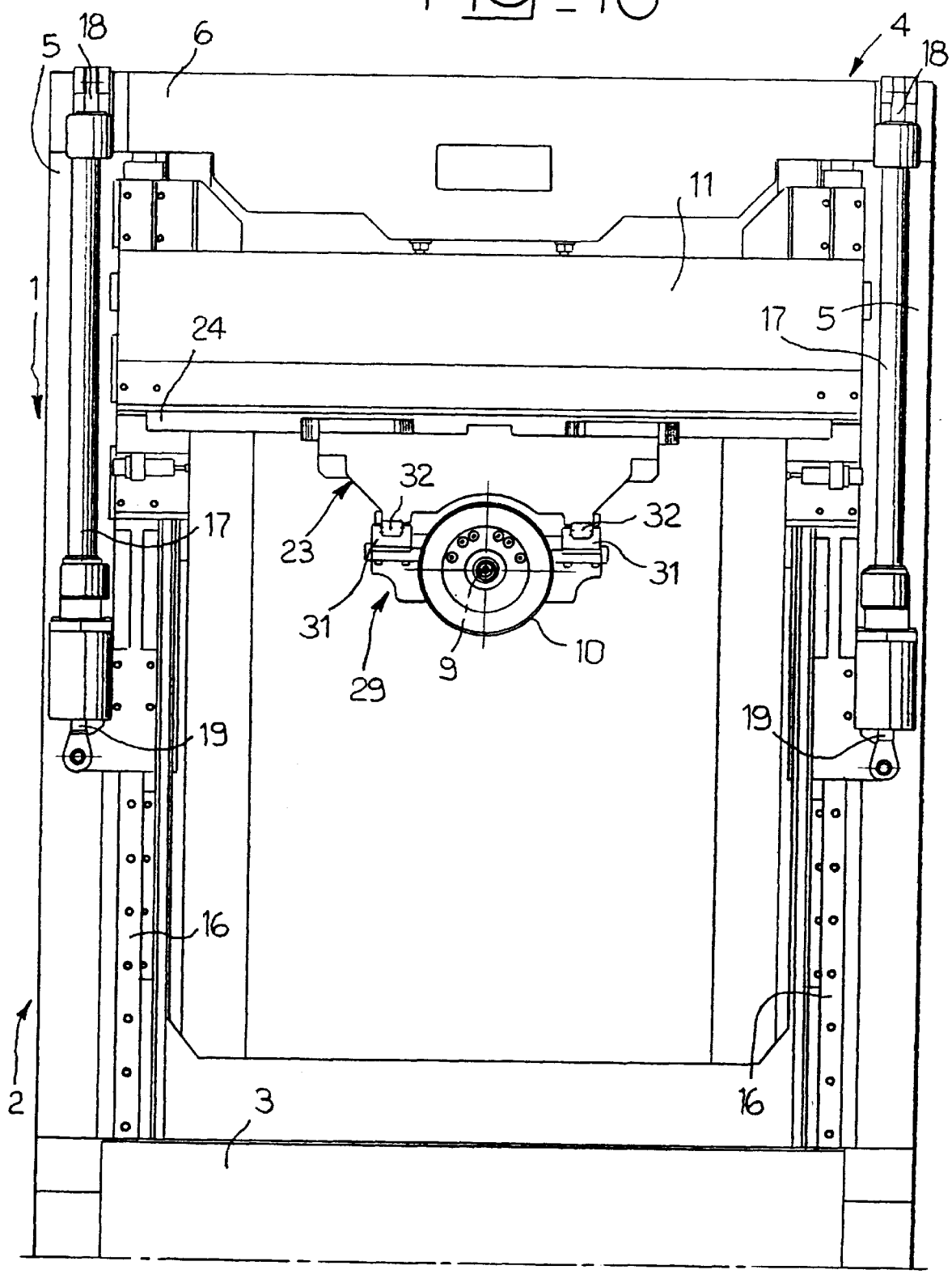

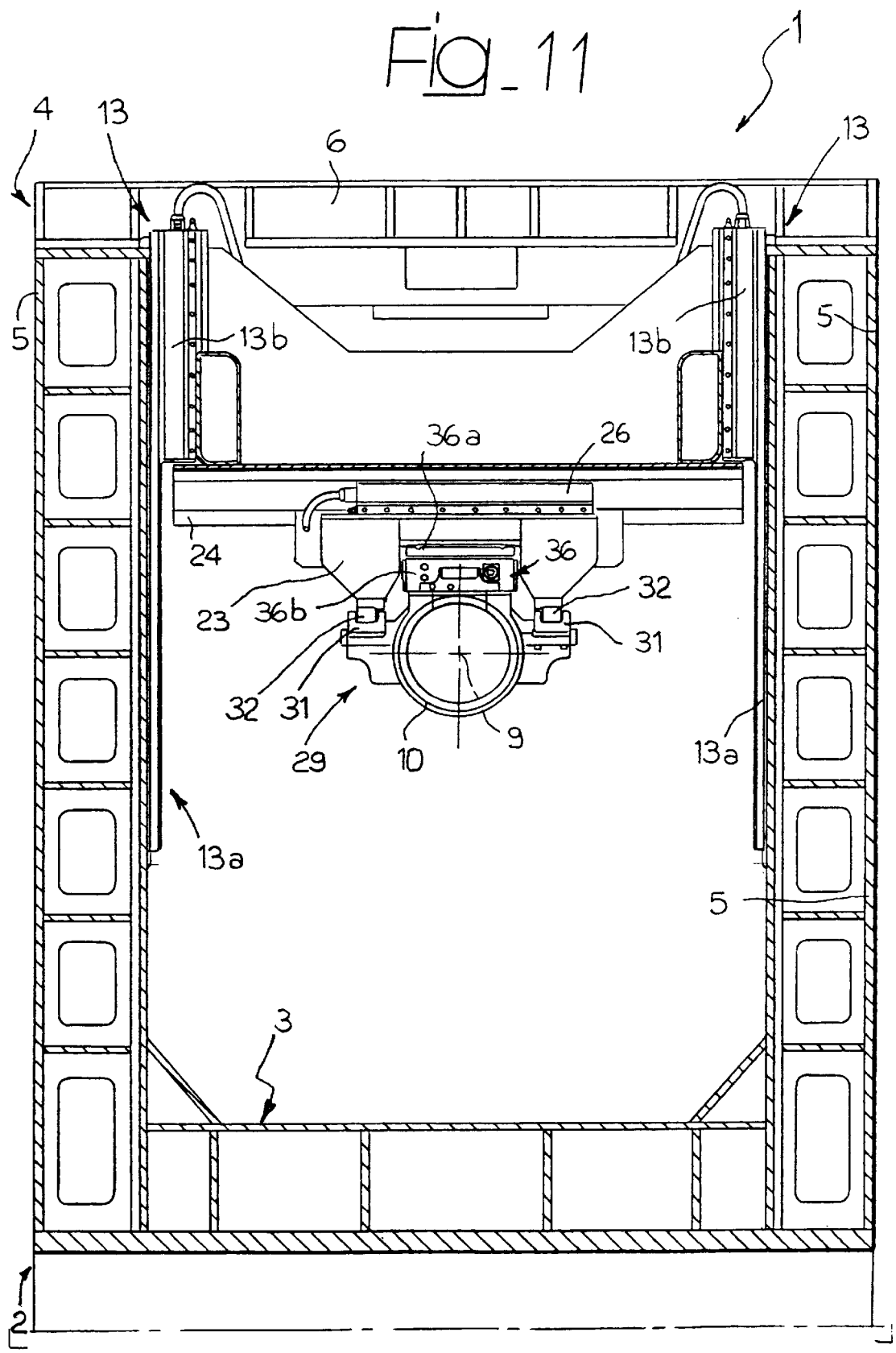

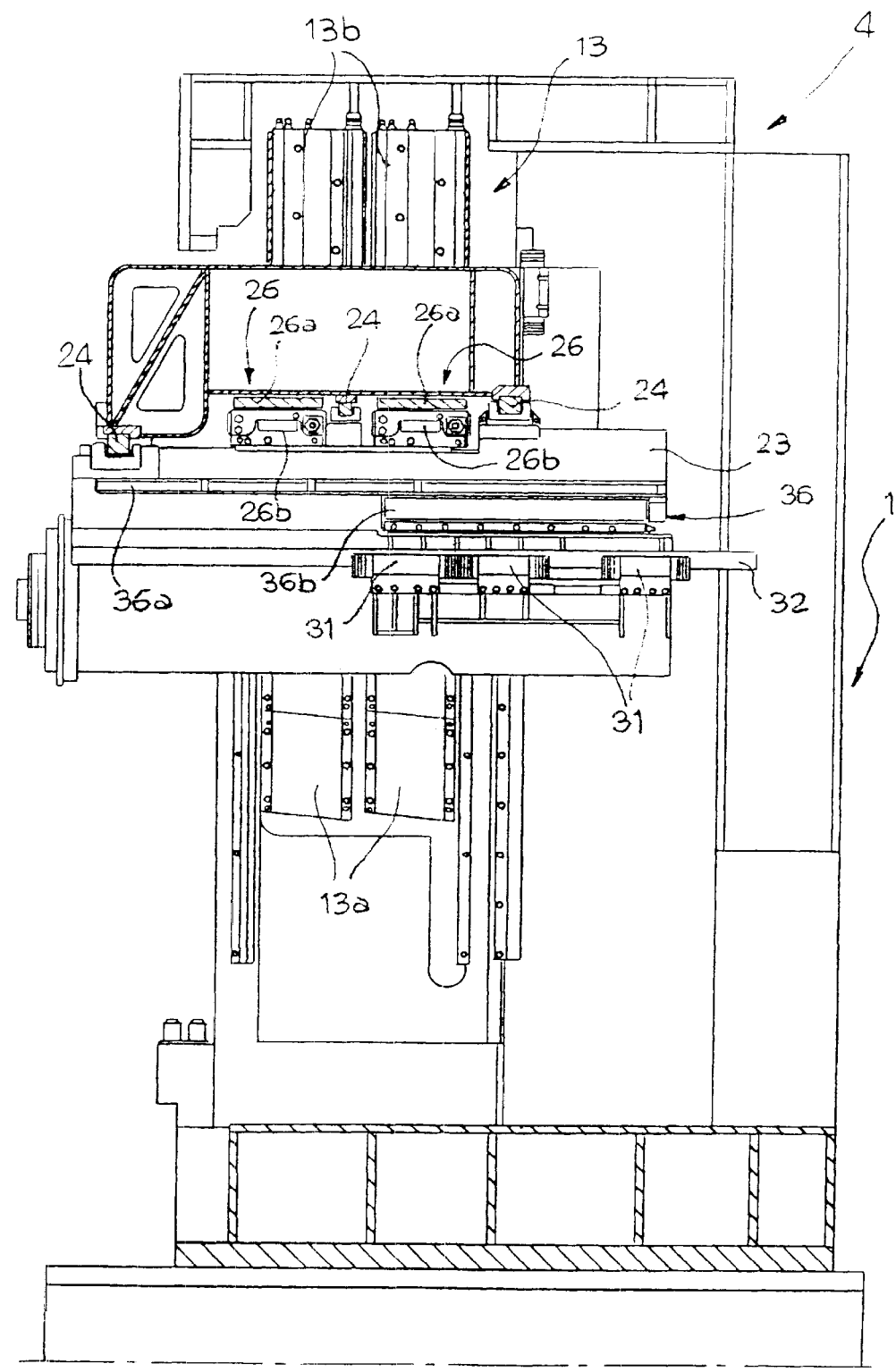
Fig_12

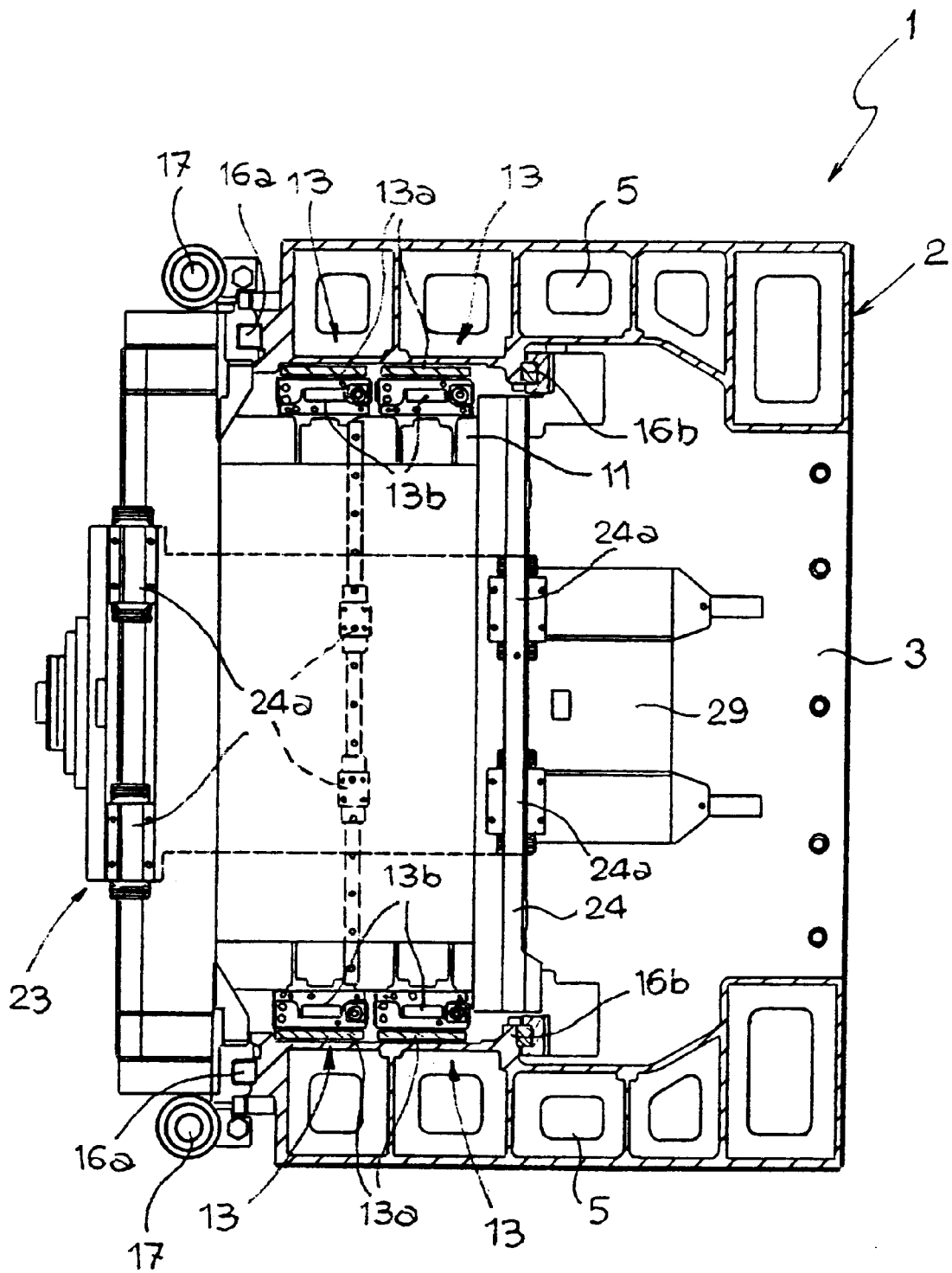
Fig_13

HIGH-SPEED PRODUCTION UNIT FOR MACHINING OPERATIONS

BACKGROUND OF THE INTENTION.

The present invention relates to high-speed production units for machining operations, of the type comprising means for supporting the piece being machined in a fixed position and a horizontal-axis spindle which carries a machining tool and is mounted, in such a way that it is turns, in a spindle-headstock structure that is displaceable along a horizontal axis Z parallel to the axis of the spindle, along a horizontal axis X perpendicular to the axis of the spindle, and along a vertical axis Y, said production unit comprising:
- a fixed supporting structure;
- a first slide mounted so that it slides on said fixed structure along one first of the aforesaid three axes X, Y, Z;
- a second slide mounted so that it slides on said first slide along one second of the aforesaid three axes X, Y, Z; and
- a third slide mounted so that it slides on said second slide along the third of the aforesaid three axes X, Y, Z, and is connected to the aforesaid spindle-headstock structure or quill.

A production unit of the type specified above is, for example, described and illustrated in the European patent EP 0 648 574. Another known machine of the type specified above is illustrated in the European patent application EP 0 742 072.

These known machines have characteristics such as to enable displacements of the spindle at high speeds, with consequent high accelerations, so as to achieve an accordingly high production capacity. Of course, the trend of recent years to design machines that are increasingly faster and are subjected to high accelerations consequently imposes the need to guarantee that the moving parts of the machine are not subjected to inclinations or deformations as a result of the accelerations and decelerations which the machine undergoes. The corresponding loads and stresses are of course all the higher, the higher the mass of the moving bodies.

SUMMARY OF THE INVENTION

The purpose of the present invention is to provide a production unit of the type specified above, which, on the one hand, is able to operate at high speeds and with high accelerations, and, on the other, can guarantee the necessary characteristics of stiffness and stability, albeit with a relatively simple and light structure.

With a view to achieving the above purpose, the subject of the invention is a production unit having the characteristics specified at the beginning of the present description, the said production unit being moreover characterized in that:
- the fixed supporting structure comprises a machine bed and a fixed portal frame comprising two side uprights and a top structure that connects the uprights together;
- the aforesaid first slide is a cross member mounted so that it slides along said vertical axis Y between the two uprights of the fixed portal frame;
- the aforesaid second slide is a carriage mounted so that it slides underneath the aforesaid cross member along the said horizontal axis X; and
- the aforesaid third slide, which is rigidly connected to the spindle-headstock structure or quill, is mounted so that it slides underneath said second slide or carriage along the aforesaid horizontal axis Z parallel to the axis of the spindle.

The particular succession (Y-X-Z) with which the axes of the production unit are cascaded, starting from the fixed structure down to spindle-headstock structure cannot be found in any known structure and enables a series of considerable advantages to be achieved, as will emerge from the ensuing description.

In a first embodiment, the said vertically mobile cross member is provided with a central column or fin rigidly connected to the cross member and extending upwards starting from the latter, said central column being guided in a sliding way through said top structure of the fixed portal frame. In addition, preferably at least one linear electric motor is provided for controlling the mobile cross member, said motor including a stator assembly mounted on said top structure of the fixed portal frame, and a mobile assembly mounted on said central column. In order to control vertical displacement of the cross member, the latter is subjected to a force applied at the aforesaid central column, at the centre of the cross member and at the centre of the fixed portal frame. This makes it possible to reduce considerably the vibrations to which the cross member may be subjected as a result of its own accelerations and decelerations.

In a second embodiment, the aforesaid vertical column or fin is absent, and the cross member has two front lateral guides and two rear lateral guides set symmetrically with respect to a vertical plane passing through the centroid of the cross member. In this case, the cross member is preferably controlled by two pairs of linear electric motors, each of which has a stator connected to an upright of the fixed portal frame, and a mobile assembly connected to one side of the cross member, the arrangement being such that the resultants of the forces applied by the two pairs of motors on the cross member are contained in a plane orthogonal to the axis Z passing through the centroid of the cross member.

Thanks to the above characteristics, in both embodiments described above it is possible to operate with considerably high accelerations and decelerations, and hence with a very high productivity, at the same time guaranteeing perfect stability of the mobile parts and the absence of flexural oscillations or torsional vibrations of the said parts, notwithstanding the fact that they have a relatively simple and light structure.

A further advantage of the particular structure and arrangement described above lies in the fact that the area of the machine bed on which the piece to be machined is set is free from guides for sliding of moving parts of the machine. Consequently, there is a complete elimination of the problem that arises in certain known machines, in which the swarf may fall on said guides, thus creating problems as regards movement of the mobile part which slides on said guides.

According to a further preferred characteristic of the invention, the aforesaid vertically mobile cross member is supported laterally by two hydraulic cylinders which substantially balance its weight, typically two hydraulic cylinders, each of which is supplied by an accumulator of hydraulic fluid under pressure.

Again owing to the particular arrangement described above, the machine according to the invention presents very reduced overall dimensions at the front (in a plane perpendicular to the axis of the spindle). Thanks to the complete separation between the area where the slide guides for the moving parts of the machine are present and the area supporting the workpiece, also draining and emptying-off of the coolant and the swarf can be carried out in a simpler and more efficient way.

The use of linear motors, the application of which to machines of this type is on the other hand already known, is optimal on account of the characteristics of speed and precision of this type of motors. For this reason, also the slide which moves along the X axis and the slide which moves along the Z axis are preferably controlled by linear electric motors. However, it is also possible to envisage a drive with rotating electric motors and ball-screw transmission systems for any axis of the machine.

Further characteristics that form the subject of the present invention are specified in the claims. The advantages of the invention will emerge from the ensuing description, with reference to the attached drawings, which are provided purely to furnish non-limiting examples, and in which:

BRIEF DESCRIPTION OF THE DRAWINGS

FIG. 10 is a front view of a second embodiment of the machine according to the invention;

FIG. 11 is a rear view of the machine of FIG. 10; and

FIGS. 12 and 13 sectional views, in a vertical plane and in a horizontal plane, of the machine of FIG. 10.

DETAILED DESCRIPTION OF THE INVENTION

Figure 1:
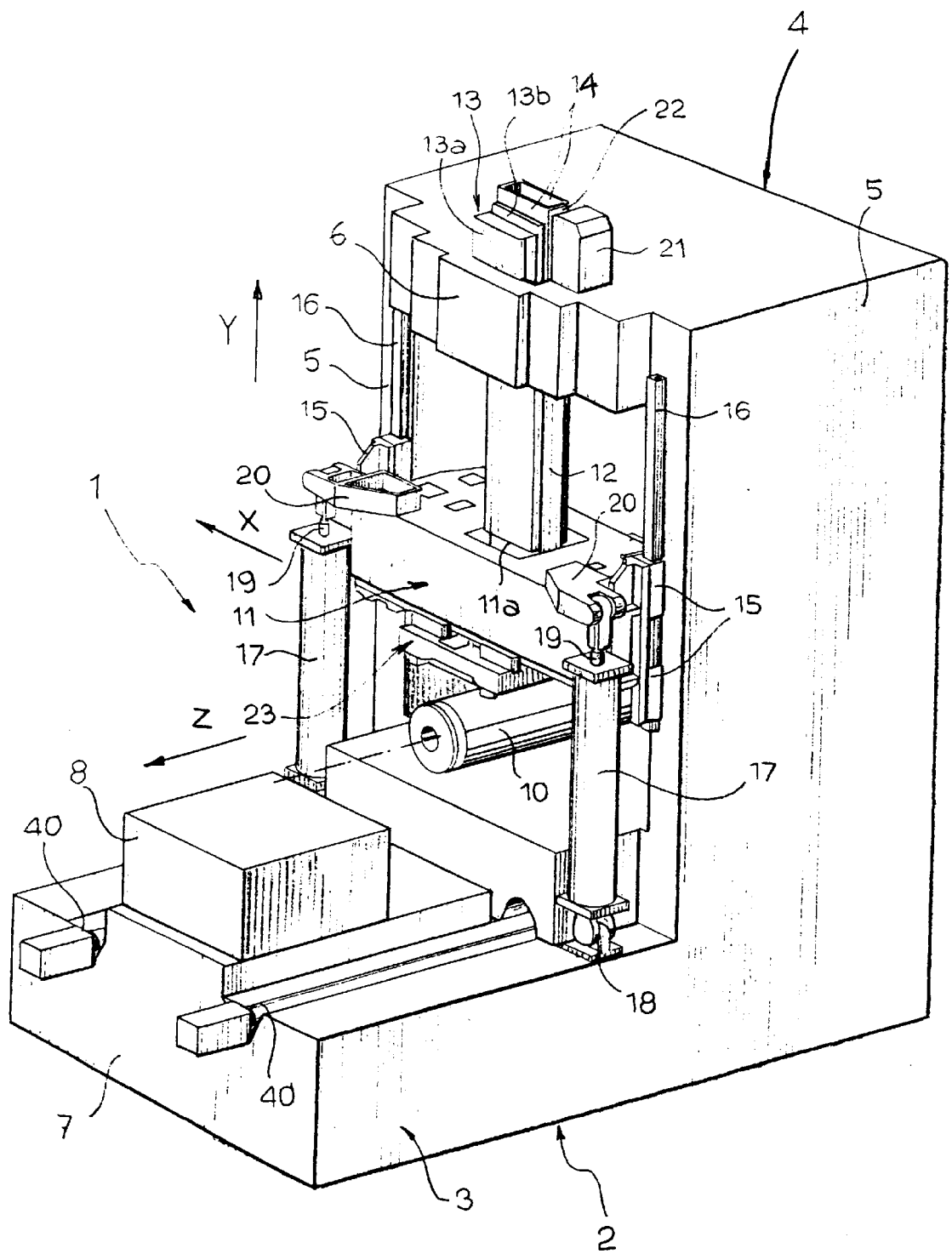
FIG. 1 is a schematic perspective view of a high-speed production unit for machining operations with removal of stock, according to a first embodiment of the invention.
Figure 2:
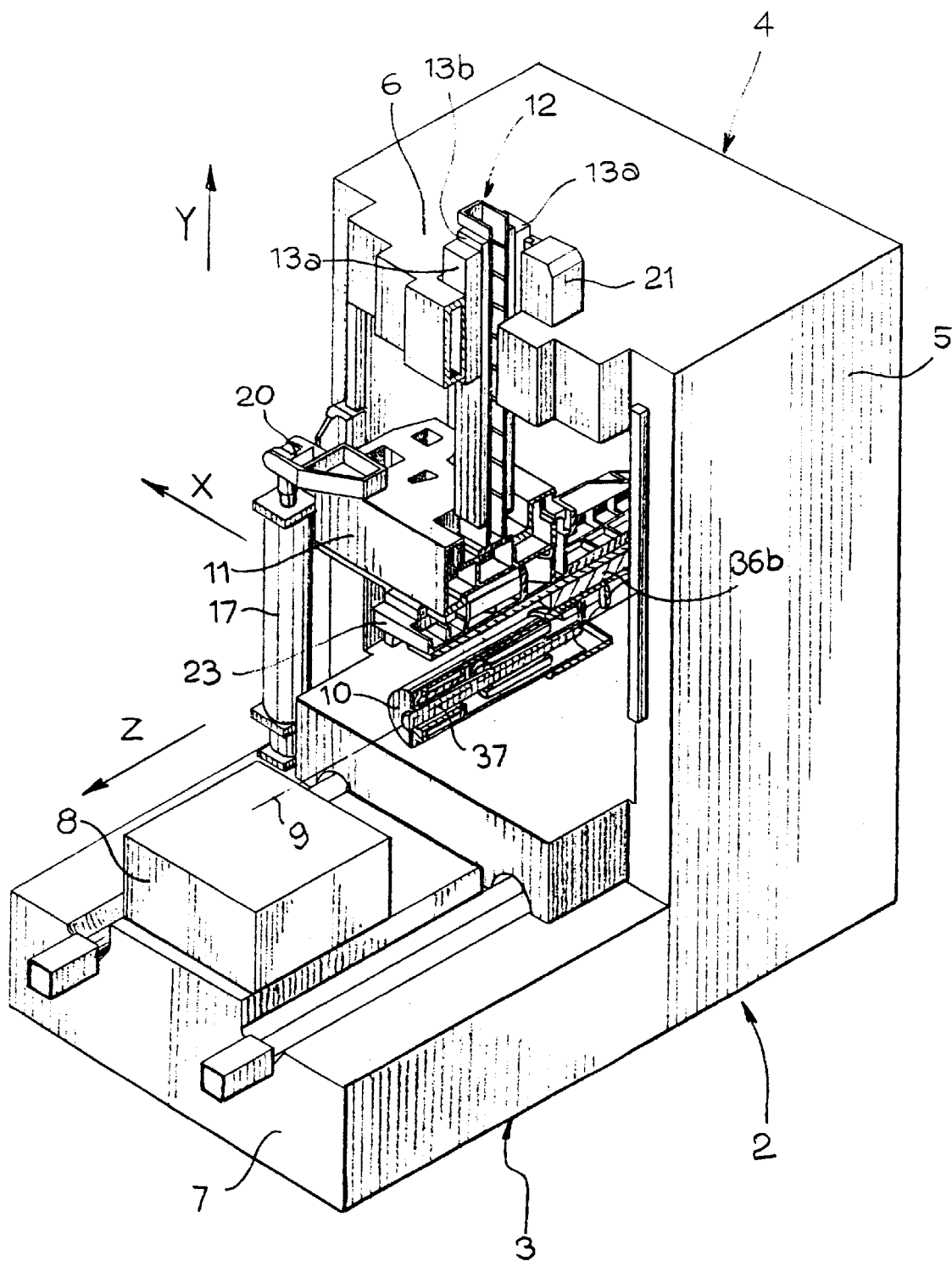
FIG. 2 is a partially sectioned perspective view of the unit of FIG. 12.

With reference to the drawings, the number 1 designates, as a whole, a high-speed machine tool for machining operations with removal of stock, comprising a fixed supporting structure 2 including a machine bed 3 and a fixed portal frame 4 which comprises two side uprights 5 connected by a top structure 6. The bed 3 has a portion 7 that extends at the front with respect to the portal frame 4 with a bench 8 for resting and clamping the workpiece. The drawings do not illustrate the means used for this purpose in so far as they may be of any known type and, of themselves, do not fall within the scope of the present invention.

The machine according to the invention can be used for carrying out machining operations with removal of stock of any type, such as machining of cylinder heads or of engine blocks for internal-combustion engines for motor vehicles, or of gearboxes for motor vehicles, etc.

Machining is performed by means of a spindle having a horizontal axis 9, which rotates inside a spindle-headstock structure or quill 10 that is displaceable, as will emerge clearly in what follows, along a vertical axis Y, along a horizontal axis Z parallel to the axis 9 of the spindle, and along a horizontal axis X perpendicular to the axis 9 of the spindle. As will emerge clearly in the sequel, the fixed portal frame 6 is set in such a way that the general plane where the portal frame lies is orthogonal to the axis 9 of the spindle. The possibility of moving the spindle-headstock structure or quill 10 in the three directions X, Y, Z defined above (see, for example, FIG. 1) is obtained by setting three guided slides in the aforesaid three directions with respect to one another. One first slide consists of a cross member 11 which is mounted so that it slides between the two uprights 5 of the fixed portal frame 4 along the vertical direction Y. A perspective view of the cross member 11 taken by itself may be seen in FIG. 6 of the annexed drawings. In the preferred example of embodiment of the invention that is illustrated, the cross member 11 has a boxed structure, preferably made of spheroidal graphite cast iron. Stiffening diaphragms are set inside the cross member to increase torsional rigidity of the latter and to limit the deformations due to inertial loads in the central area, where a seat 11a is defined for attachment of a central column 12, which is rigidly connected to the cross member 11 and extends upwards starting from the latter (see also FIG. 5, in which the internal diaphragms of the cross member 11 may moreover be seen). The central column 12 is mounted in a sliding way, as will be illustrated in detail in what follows, through the top structure 6 of the fixed portal frame 4, and therefore performs the function of an element that transmits to the cross member 11 the thrust generated by respective linear electric driving motors in order to obtain displacement along the Y axis.

More precisely, in the preferred embodiment of the invention, the central column 12 presents an elongated structure with a rectangular section, with stiffening ribs 12a (FIG. 5) which are also preferably made of spheroidal graphite cast iron. Displacement of the cross member 11 along the Y axis is obtained by means of two linear electric motors 13 associated to the two larger walls 14 set opposite one another of the central column 12. The structure of each linear electric motor 13 is not described in detail herein in so far as it is of a type in itself known. According to a by now conventional technique, each linear electric motor 13 comprises a stator assembly 13a, which is connected to the top structure 6 of the fixed portal frame 4, and a mobile assembly 13b which is connected to the wall 14 of the column 12. In the preferred embodiment, the stator 13a carries the motor windings, whilst the mobile part 13b consists of an element almost as long as the column 12, which carries the permanent magnets. Thanks to the arrangement described above, the forces of magnetic attraction generated by the two linear electric motors 13 counterbalance one another so as not to exert stresses on the structure of the column 12. The cross member 11 is moreover provided at its sides with lateral guide shoes 15 mounted sliding on vertical guides 16 carried by the uprights 5 of the fixed portal frame 4. Two pneumatic cylinders 17 are moreover provided at the sides of the cross member 11, which basically have the function of balancing the weight of the latter so as to avoid the need for motors 13 to generate a thrust higher than the one necessary to overcome the weight of the cross member 11 when they control lifting of the latter. Each pneumatic cylinder 17 has a cylindrical body connected at its base to an attachment 18 carried by the machine bed 3, and a sliding stem 19 connected to an attachment 20 carried by the cross member 11.

The column 12 is mounted sliding on a guide 21 carried by the top structure 6 of the fixed portal frame 4 only at one of its side walls 22 (FIG. 1) which is orthogonal to the main walls 14.

Figure 7:
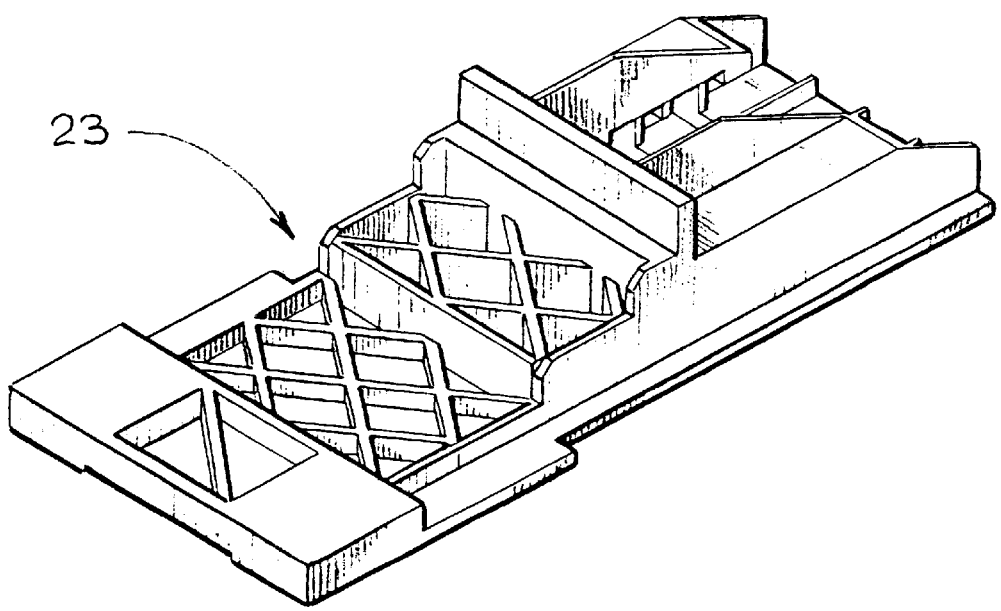

Beneath the cross member 11 is mounted a slide 23 which slides along the X axis. A perspective view of the slide 23 taken by itself may be seen in FIG. 7. Also this slide preferably has a structure made of spheroidal graphite cast iron and is stiffened by a dense series of diagonal ribbings designed to guarantee containment of the deformations generated by the working stresses and by the forces of magnetic attraction produced by the linear electric motors that drive the moving parts of the machine.

Figure 5:
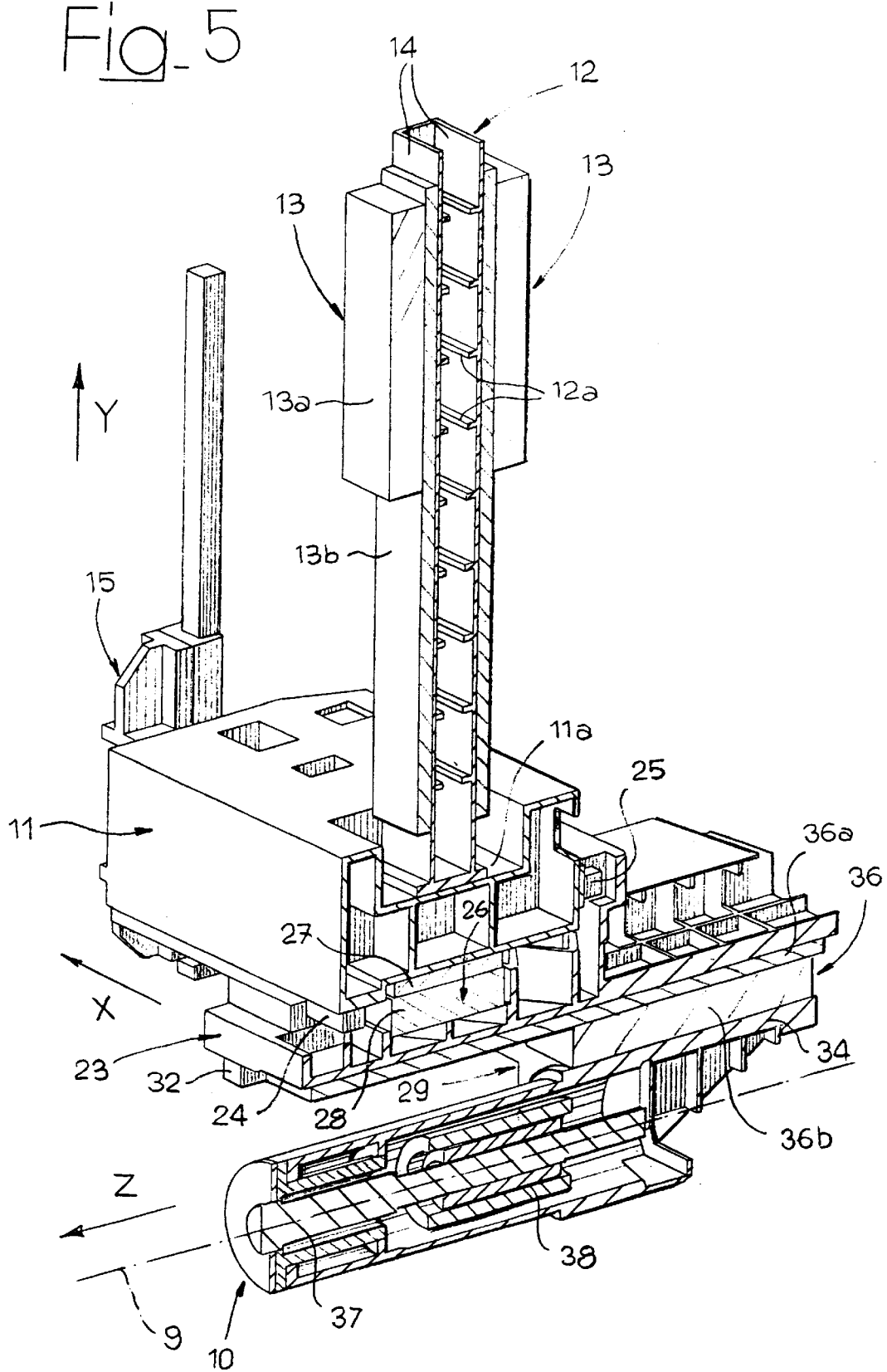
FIG. 5 is a partially sectioned perspective view of one part of the machine of FIG. 1.
Figure 6:
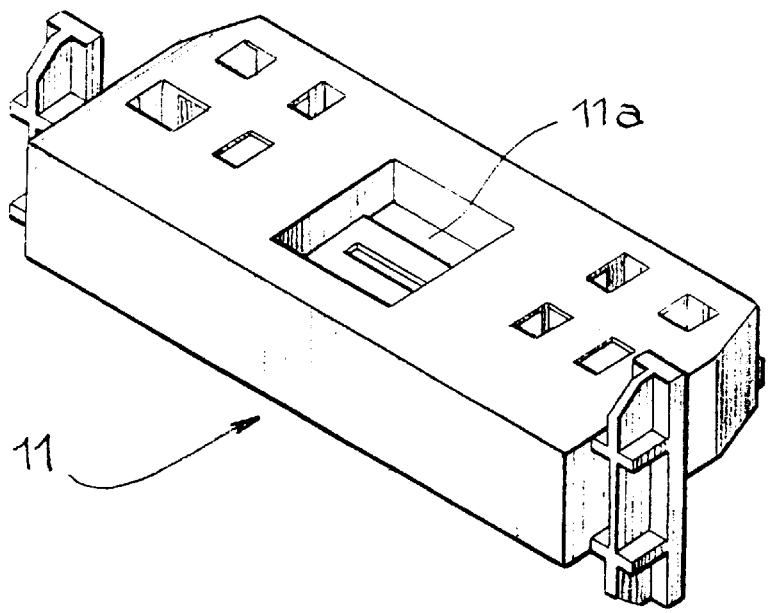
FIGS. 6–9 are perspective views of certain components of the machine of FIG. 1.

With reference to FIG. 5, the slide 33 is mounted so that it slides on guides 24, 25 fixed to the cross member 11, and is controlled by a linear motor 26 having a stator assembly 27 secured beneath the cross member 11 and comprising the windings, and a mobile assembly 28 fixed to the slide 23 and comprising the permanent magnets.

Figure 8:
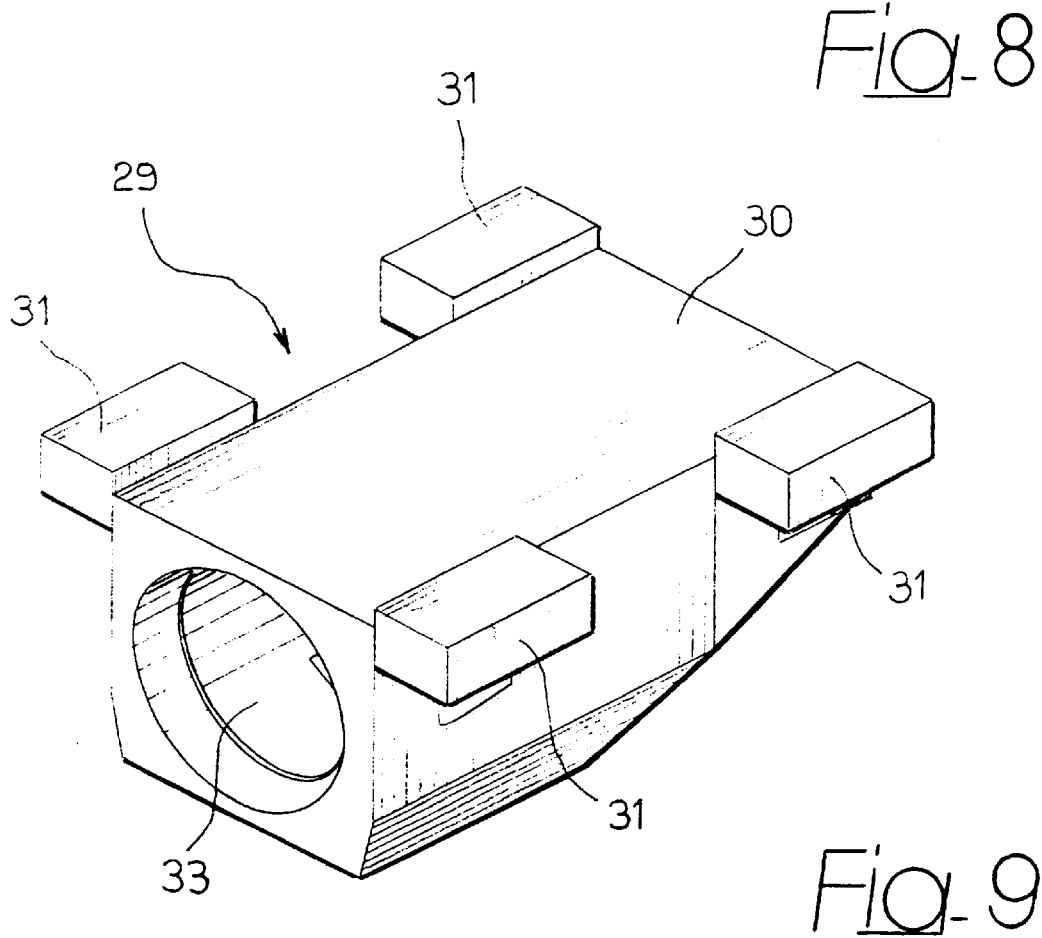
Figure 9:
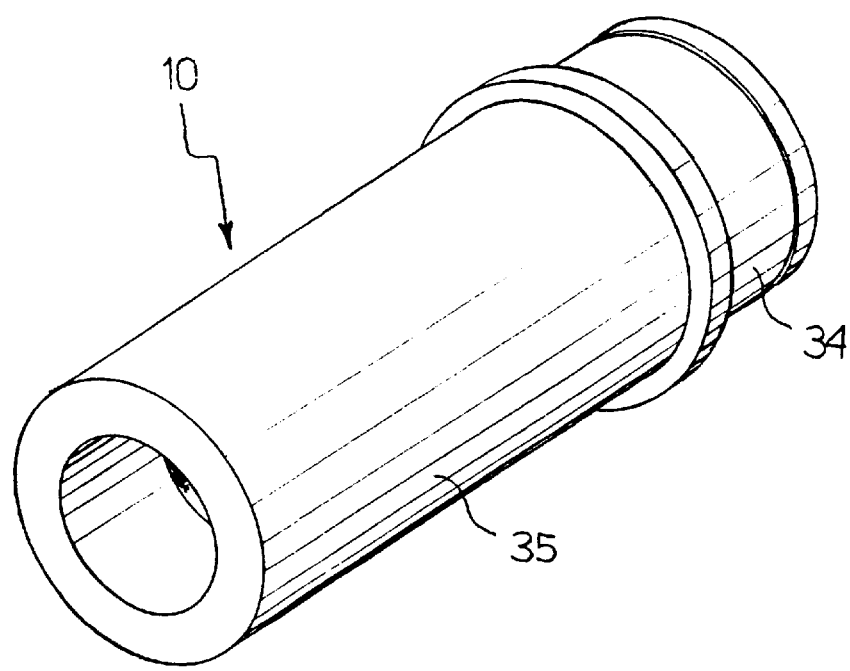

Mounted underneath the slide 23, so that it slides along the Z axis, is a further slide 29, which may be seen, taken by itself and in perspective view, in FIG. 8. The slide 29 has a top surface 30 provided with four lateral shoes 31 which are mounted in a sliding way on two guides 32 (see FIGS. 3, 4, and 5) that are fixed underneath the slide 23 and extend parallel to the Z axis. The slide 29 has a body defining a cylindrical cavity 33 which receives and supports an end portion 34 of the spindle headstock structure 10. The latter, which may be seen as a whole in FIG. 9, has a cylindrical body having a main portion 35 that projects in cantilever fashion at the front from the slide 29 in the direction of the Z axis.

Displacement of the slide 29 along the Z axis is controlled by a linear electric motor 36 comprising a stator 36a that carries the windings and is fixed to the bottom surface of the slide 23, and a mobile assembly 36b which is fixed to the top wall of the slide 29.

The spindle-headstock structure or quill 10, supports, in rotation about the axis 9, a spindle 37 (FIG. 5) by means of rolling bearings, and moreover includes, inside it, a rotating electric motor 38 for controlling rotation of the spindle 37.

Figure 3:
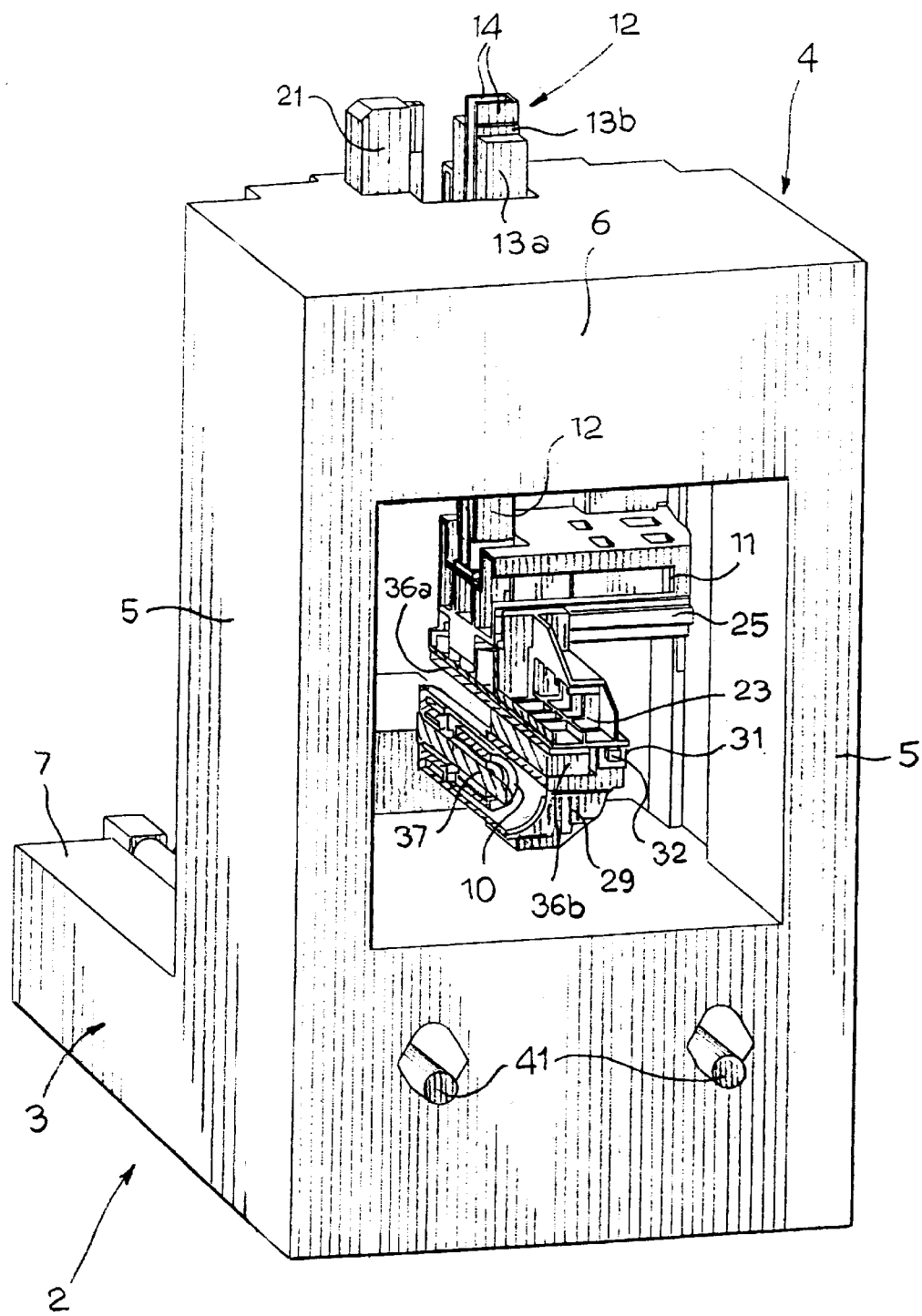
FIG. 3 is a partially sectioned rear perspective view.
Figure 4:
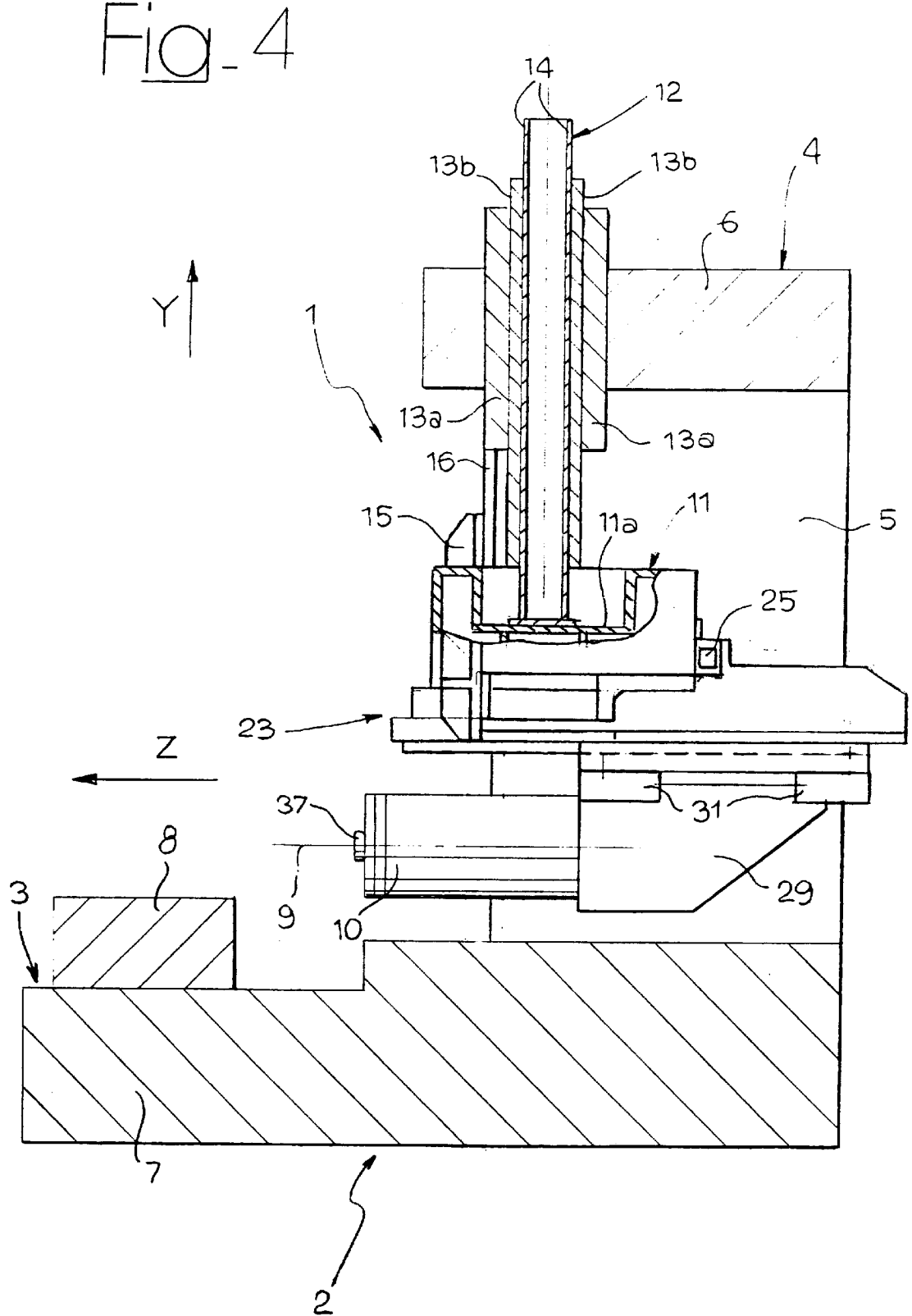
FIG. 4 is a sectional view of the machine according to the invention, in a plane perpendicular to the X axis.

In the area supporting the workpiece, the bed 3 presents two longitudinal channels 40 for collecting swarf and coolant, where screw-conveyor devices may be provided, the shafts 41 of which may be seen in FIG. 3, for conveying the said waste material through tunnels made in the rear part of the bed 3, for discharge thereof. As illustrated previously, the particular arrangement of the machine according to the invention makes it possible to leave the area for collection of swarf free from guides for sliding of moving parts of the machine, so that the swarf does not create any problems for proper operation of the machine. The cross member 11 that moves vertically is subjected to a central thrust, applied at the column 12, generated by the two linear electric motors 13 set opposite one another, the forces of attraction of which offset one another. As discussed above, this makes it possible, on the one hand, to simplify considerably control of the motors, and, on the other, to obtain a relatively simple and agile structure, and one, at the same time, which is free from risks of vibrations or excessive inclinations. The sequence Y, X, Z of the axes along which the displacements of the moving slides of the machine are controlled enables a large number of advantages to be obtained. The area supporting the workpiece is altogether separate from the area of displacement of the moving parts of the machine, so that there does not exist any risk of swarf dropping onto the slide guides and creating problems. The fixed structure that supports the machine is extremely simple and of very reduced overall front dimensions. The use of linear electric motors enables high operating speeds to be achieved, as well as precise positioning of the moving parts of the machine. The fact that the various structures are made of spheroidal graphite cast iron makes it possible to lighten the machine even further without any prejudice to the characteristics of stiffness. During a drilling operation, only one slide of the machine (the slide 29) is displaced along the Z axis, so as to reduce moving masses to the minimum. All this results in a relatively simple and not very costly machine which is able to operate at high speeds and with high accelerations.

Of course, without prejudice to the principle of the invention, the details of construction and the embodiments may vary widely with respect to what is described and illustrated herein purely for the purpose of providing an example, without thereby departing from the scope of the present invention.

For example, the fixed structure of the machine may carry a tool magazine, for instance of the horizontal-axis carousel type, to enable the spindle-headstock structure to position itself in the vicinity of the magazine so as to carry out tool change automatically.

In a possible variant, the two balancing cylinders 17 are set with their axes further back, in the median plane passing through the centroid of the vertically mobile cross member 11. In addition, of course the use of spheroidal graphite cast iron mentioned above constitutes merely one possibility, it being equally possible to build the machine components of steel. A further preferred variant envisages that the cross member 11 be mounted in such a way that it slides on four vertical guides 16, two front ones and two rear ones, carried by the uprights 5 of the portal-frame structure 4. Of course, also the constructional details illustrated in the drawings may be widely varied. For example, the spindle-headstock structure or quill 10 may be made of a single piece with the slide 29.

With reference now to FIGS. 10–13, which illustrate a second embodiment of the invention, the parts corresponding to those already described are designated by the same reference numbers.

The most important difference of the second embodiment of the machine according to the invention with respect to the first embodiment described previously lies in the fact that the central column 12 is absent in the second embodiment. In this case, the cross member 11 is mounted so that it slides along the vertical axis Y on two uprights 5 of the fixed portal-frame structure by means of a pair of front lateral guides 16a and a pair of rear lateral guides 16b which are set symmetrically with respect to the median vertical plane of the cross member (see FIG. 13). The displacements of the cross member 11 along the Y axis are controlled by two pairs of linear motors 13, each of which has a stator 13a (which in the example illustrated carries the permanent magnets) connected to the fixed structure, and a mobile part (which in the example illustrated carries the windings) connected to the cross member 11. Again with reference to FIG. 13, the arrangement of the four guides 16a, 16b and of the two pairs of linear motors 13 is such that the resultants of the forces applied by the motors to the cross member are contained in a plane perpendicular to the Z axis and passing through the centroid of the cross member. This makes it possible to minimize the weight of the mass of the cross member 11, and consequently the installed power of the motors, as well as reducing torsional and flexural structural failures during acceleration and deceleration transients. The arrangement described above also enables minimization of torsional failures, about the Z axis, of the assembly made up of the cross member 11, on the carriage 23, and the quill 10.

A further difference with respect to the first embodiment of the invention that was described previously lies in that fact that, in this case, the two hydraulic cylinders, which are hydraulic cylinders supplied by an accumulator of hydraulic fluid under pressure (not visible in the drawings), have their ends 19 connected to the cross member 11, and their ends 18 connected to the top structure 6 of the fixed portal frame 4.

With reference to FIG. 11, the quill 10 is mounted so that it slides on two guides 32 set symmetrically with respect to the linear driving motor 36 which includes an assembly 36a carrying the permanent magnets and rigidly connected to the carriage 23, which slides along the X axis, and an assembly 36b which is rigidly connected to the structure of the quill, and with respect to which the two guides 32 are set symmetrically.

The second slide or carriage 23 has a boxed structure, with a substantially rectangular section, and is mounted in a sliding way beneath the cross member, in this case by means of three parallel guides 24, a front one, a rear one, and an intermediate one. Displacements along the X axis are controlled by two linear electric motors 26 (FIG. 12), each of which has an assembly 26a carrying the permanent magnets and being rigidly connected to the cross member 1, and an assembly 26 which carries the windings and is rigidly connected to the structure of the carriage 23. The intermediate guide 24 is set between the two linear electric motors 26.

Of course, although the foregoing description and the drawings annexed hereto refer to the use of linear electric motors, both embodiments of the machine according to the invention may envisage, for at least some of the moving parts, rotating electric motors of a traditional type which control the moving parts by means of a ballscrew system.

With reference again to FIG. 11, the guides 32 for displacing the quill along the Z axis are carried by the carriage 23, whilst the shoes 31 are carried by the quill, and this makes it possible to isolate and protect, by means of telescopic guards, the guides and shoes from the lubricant-coolant and from the swarf produced in the shearing area.

The three guides 24 along the X axis and the location of the linear electric motors 26 at the two sides of the intermediate guide 24 enables minimization of structural failures of the carriage itself and flexural distortions of the guides of the Z axis that are generated by the forces of magnetic attraction of the linear motors. Basically, the constraints of the three guides of the X axis enable a light carriage to be obtained and guarantee a very high level of rectilinearity of the guides of the Z axis.

As already mentioned, the four guides 16a, 16b, of the vertical axis Y make it possible to obtain an extremely light cross piece which is provided with very high torsional rigidity about the X axis and very high flexural rigidity in the X-Y plane.

Also in the case of the second embodiment, the constructional details may of course vary widely with respect to what is illustrated herein purely for the purpose of providing examples.

What is claimed is:

1. A production unit for machining operations, comprising means for supporting a piece being machined in a fixed position, and a spindle with a horizontal axis which carries a machining tool and is mounted in a spindle-headstock structure that is displaceable along a horizontal axis (Z) parallel to the axis of the spindle, along a horizontal axis (X) perpendicular to the axis of the spindle, and along a vertical axis (Y), said production unit comprising:

a fixed supporting structure;

a first slide mounted for sliding on said fixed supporting structure along a first of said three identified axes;

a second slide mounted for sliding on said first slide along a second of said three identified axes; and a third slide mounted for sliding on said second slide along a third of said three identified axes, and that is connected to the spindle-headstock structure, wherein the fixed supporting structure comprises a machine bed and a portal frame connected to the machine bed and comprising two side uprights and a top structure that connects the uprights together;

said first slide is a cross member mounted for sliding along said vertical axis (Y) between the two uprights of the fixed portal frame;

said second slide is a carriage mounted for sliding underneath the cross member along said horizontal axis (X) orthogonal to the axis of the spindle; and said third slide, which is rigidly connected to the spindle-headstock structure, is mounted for sliding underneath said second slide along said horizontal axis (Z) parallel to the axis of the spindle; and wherein said cross member is provided with a central column having at least one vertically-extending planar side and being rigidly connected to the cross member and extending upwards starting from the cross member, said central column being mounted in a sliding manner through said top structure of the fixed portal frame.

2. A production unit according to claim 1, wherein at least one linear electric motor is provided for controlling the vertically mobile cross member, said at least one motor including a stator assembly mounted on said top structure of the fixed portal frame, and a mobile assembly mounted on said central column.

3. A production unit according to claim 2, wherein altogether two linear electric motors are provided for controlling the cross member, one of which is associated to one face of the central column and the other to an opposite face of the central column.

4. A production unit according to claim 3, said stator assembly carries windings of the linear electric motors, and said mobile assembly carries permanent magnets of the linear electric motors.

5. A production unit according to claim 3, wherein said central column is mounted sliding on a single vertical guide carried by the top structure of the fixed portal frame, along one side wall orthogonal to the two aforementioned opposite walls of the column to which the two linear electric driving motors are associated.

6. A production unit according to claim 1, wherein the cross member is supported laterally by two hydraulic cylinders which substantially balance the weight thereof.

7. A production unit according to claim 6, wherein the aforesaid hydraulic cylinders are hydraulic cylinders supplied by an accumulator of hydraulic fluid under pressure.

8. A production unit according to claim 7, wherein each hydraulic cylinder has one end connected to the cross member and the opposite end connected to the top structure of the fixed portal frame or to the machine bed.

9. A production unit according to claim 1, wherein the cross members engages on at least two lateral guides carried by the uprights of the fixed portal frame.

10. A production unit according to claim 1, wherein said spindle-headstock structure comprises a tubular body that extends in cantilever fashion in the direction of the (Z) horizontal axis parallel to the axis of the spindle from a front surface of said third slide.

11. A production unit according to claim 10, wherein the aforesaid third slide has a top wall provided with lateral shoes mounted sliding on guides that are carried underneath and by the second slide.

12. A production unit according to claim 11, wherein a single linear motor for controlling displacement along the (Z) horizontal axis parallel to the spindle axis is provided, with respect to which the slide guides for sliding along the (Z) horizontal axis parallel to the spindle axis are set symmetrically.

13. A production unit according to claim 1, wherein the aforesaid machine bed has a portion with a part set in front of the fixed portal frame and carrying a bench for supporting the workpiece, and channels for collecting swarf and coolant, said portion of the machine bed where the workpiece is set being free from guides for sliding of moving parts of the production unit.

14. A production unit according to claim 1, wherein each one of the three slides has a structure made of spheroidal graphite cast iron.

15. A production unit according to claim 1, wherein the second slide and third slide are controlled by linear electric motors.

16. A production unit according to claim 1, wherein the aforesaid cross member has a top wall, a bottom wall, two side walls, a front wall, and a rear wall, and a plurality of internal stiffening diaphragms, the top wall having at its center a lowered seat on the bottom of which the base of the aforesaid central column is fixed.

17. A production unit according to claim 1, wherein the aforesaid second slide has a basically plate-like generally rectangular structure provided with a plurality of diagonal stiffening ribbings.

18. A production unit according to claim 1, wherein the aforesaid second slide or carriage has a boxed structure and is mounted so that it slides underneath the cross member by means of three guides, an intermediate one of which is set between two linear electric motors for controlling displacement of the carriage along the horizontal (X) axis orthogonal to the axis of the spindle.

* * * * *